US011655030B2

(12) United States Patent
Cronk et al.

(10) Patent No.: US 11,655,030 B2
(45) Date of Patent: May 23, 2023

(54) INFLATABLE IMPACT ATTENUATOR FOR PARACHUTED ITEMS

(71) Applicant: HDT Expeditionary Systems, Inc., Solon, OH (US)

(72) Inventors: David C. Cronk, Moab, UT (US); Thomas J. Price, Jr., Prescott, AZ (US); Curtis Glen Lilly, II, Waynesboro, VA (US); Phillip Kevin Almarode, Waynesboro, VA (US)

(73) Assignee: HDT Expeditionary Systems, Inc., Solon, OH (US)

( * ) Notice: Subject to any disclaimer, the term of this patent is extended or adjusted under 35 U.S.C. 154(b) by 22 days.

(21) Appl. No.: 17/350,495

(22) Filed: Jun. 17, 2021

(65) Prior Publication Data

US 2021/0403162 A1    Dec. 30, 2021

Related U.S. Application Data

(60) Provisional application No. 63/045,595, filed on Jun. 29, 2020.

(51) Int. Cl.
   *B64D 1/14*    (2006.01)
(52) U.S. Cl.
   CPC ...................................... *B64D 1/14* (2013.01)
(58) Field of Classification Search
   CPC ....... B64D 1/14; B65D 19/0002; B65D 19/40
   See application file for complete search history.

(56) References Cited

U.S. PATENT DOCUMENTS

| | | | |
|---|---|---|---|
| 2,774,560 A | 12/1956 | Johnson | |
| 2,964,139 A | 12/1960 | Wittl et al. | |
| 3,266,757 A * | 8/1966 | Guinne | B60V 3/02 180/127 |
| 3,625,461 A * | 12/1971 | Guienne | B64D 1/14 244/138 R |
| 3,994,474 A | 11/1976 | Finkbeiner | |
| 4,111,406 A | 9/1978 | Zanow | |
| 4,205,811 A | 6/1980 | Palm et al. | |
| 5,735,083 A | 4/1998 | Brown et al. | |
| 5,816,535 A | 10/1998 | Underwood, Jr. et al. | |
| 6,059,497 A | 5/2000 | Iannone | |
| 6,237,875 B1 | 5/2001 | Menne et al. | |
| 6,517,108 B1 | 2/2003 | Vinton et al. | |
| 7,775,554 B2 | 8/2010 | Smydra et al. | |
| 10,077,114 B2 | 9/2018 | Jones et al. | |
| 10,343,790 B2 | 7/2019 | Kamihara et al. | |
| 10,427,788 B1 * | 10/2019 | Grenga | B64D 1/14 |
| 10,479,533 B2 | 11/2019 | Albright et al. | |
| 2008/0017754 A1 | 1/2008 | Taylor et al. | |

(Continued)

FOREIGN PATENT DOCUMENTS

| | | | | |
|---|---|---|---|---|
| CN | 108382598 A * | 8/2018 | ............... | B64D 1/14 |
| WO | WO 2013/088285 A1 | 6/2013 | | |

*Primary Examiner* — Richard G Davis
(74) *Attorney, Agent, or Firm* — Lippes Mathias LLP

(57) ABSTRACT

A system for cushioning airdropped cargo includes a pallet supporting associated cargo. At least one lower inflatable impact attenuator in the form of a pneumatic cushion is positioned between the pallet and the cargo. A compression pad is positioned between the lower pneumatic cushion and the cargo. At least one upper pneumatic cushion is positioned atop the cargo. A parachute is connected by parachute rigging to the pallet.

19 Claims, 14 Drawing Sheets

(56) References Cited

U.S. PATENT DOCUMENTS

| | | | |
|---|---|---|---|
| 2009/0179398 A1 | 7/2009 | Mullican et al. | |
| 2010/0140388 A1 | 6/2010 | London et al. | |
| 2011/0240800 A1* | 10/2011 | Fox, Jr. | B64D 1/14 244/137.1 |
| 2012/0025027 A1* | 2/2012 | Yandle | B64D 1/14 410/87 |
| 2014/0353431 A1* | 12/2014 | Franceschi | B64D 1/14 244/138 R |
| 2015/0069185 A1* | 3/2015 | Parkinson | B64D 1/14 244/137.3 |
| 2015/0300513 A1 | 10/2015 | Smets | |
| 2021/0354824 A1* | 11/2021 | Klaftenegger | B64D 1/14 |

\* cited by examiner

INFLATABLE IMPACT ATTENUATOR FOR PARACHUTED ITEMS

This application claims the benefit of Provisional Application Ser. No. 63/045,595 which was filed on Jun. 29, 2020, and the entire content of said provisional application is incorporated hereinto by reference.

BACKGROUND

This disclosure pertains to a system for the airborne deployment of cargo held on a pallet.

As is well known, cargo or payload that is secured to a pallet or platform is often air dropped from an aircraft. Parachute rigging is, in turn, secured to the pallet with the parachute being used to slow the descent of the cargo held on the pallet. Needless to say, the cargo which is air dropped must be properly restrained on the pallet. Unrestrained cargo poses a significant danger during deployment of the palletized cargo both to the cargo itself, as well as to crew members and the aircraft which deploys the cargo. The landing of palletized cargo dropped by parachute from an airplane is affected by the various landing systems mounted to the pallet, which landing systems are designed to attenuate the landing loads imposed on the cargo upon impact of the pallet with the ground surface.

One of the major concerns with the deployment of such palletized cargo is the landing impact on the cargo itself. In many fields, it is desirable or necessary to cushion an object or package against an impact shock. This is particularly true with regard to air dropped cargo. Even with a parachute assisted landing, the forces encountered by the cargo upon ground impact can be substantial. These forces are magnified with heavier cargo, such as, for example, vehicles which may be air dropped. Without proper cushioning, these impact forces would damage the vehicle in question, perhaps rendering the vehicle incapable of being driven away from the pallet. Clearly, protecting the vehicles from impact damage is quite important.

One type of heavy cargo which is often air dropped to a remote or relatively inaccessible area may be a military vehicle. Because of the significant size and weight of such military vehicles and the need to protect them from shock, and given the relatively high descent rates for such air dropped cargo, it is necessary to cushion such cargo so that the vehicle can be employed promptly. In the case of military drops, the cargo may be under hostile gun fire during the time of its descent and, in many applications, a restricted delivery space may require that the items be delivered from relatively low altitude and at an increased descent rate in order to both hit the designated target area and to reduce the possibility of hostile fire hitting the cargo. It should be apparent that such cargo needs to be well cushioned when it is airdropped.

It is known to provide impact attenuation systems employing airbags, balloons or the like inflatable structures which are positioned between the pallet and the bottom surface of the cargo. Such balloons are inflated shortly before the pallet lands, thereby lessening the impact of landing on the cargo.

One major concern with the landing of palletized cargo is the need to keep the center of gravity of the load on the pallet as low as possible. For example, wind may be blowing at the time that the palletized cargo lands and if the pallet has a relatively high center of gravity, this may result in the pallet overturning, thereby damaging the cargo contained on the pallet. Unfortunately, if the pallet is overturned, the known balloons would not protect the cargo. Currently, it is not known to provide balloons positioned atop the cargo. Thus, there exists a need for better cushioning the impacts on the cargo which are associated with a landing so as to also protect the top surface of palletized cargo from any impact damage if the cargo is overturned on landing. It would be desirable to prevent damage to the upper surface of cargo, particularly a vehicle if a pallet holding the vehicle is overturned upon landing.

In connection with palletized vehicles which are airdropped, it is also desirable to better cushion the undercarriage of the vehicle so that the undercarriage does not suffer damage (for example to the transmission, shocks, or fuel tanks) upon an impact landing, because such damage may adversely impact the ability of a driver to quickly drive the vehicle off the pallet once the cargo has landed. Therefore, it would be desirable to provide additional cushioning between the vehicle's undercarriage and the pallet to better protect the vehicle and prevent damage thereto.

BRIEF SUMMARY

According to one embodiment of the present disclosure, there is provided a system for cushioning air dropped cargo. The system can comprise a pallet capable of supporting associated cargo, the pallet including an upper surface and a lower surface. At least one lower pneumatic cushion is positioned on the pallet upper surface. A pneumatic circuit interconnects the at least one lower pneumatic cushion with a source of pressurized air. A compression pad is positioned between the at least one lower pneumatic cushion and the associated cargo. At least one upper pneumatic cushion is positioned atop the associated cargo. A parachute which is connected to a parachute rigging is provided wherein the parachute rigging is releasably coupled to the pallet.

According to another embodiment of the present disclosure, a system for cushioning air dropped cargo upon landing comprises a pallet, cargo supported on the pallet, a lower cushioning assembly interposed between the pallet and the cargo, the lower cushioning assembly comprising an inflatable bladder which is inflated upon decent of the pallet, and an upper cushioning assembly located atop the cargo, the upper cushioning assembly comprising a pre-inflated bladder.

According to still another embodiment of the present disclosure, a system for cushioning air dropped cargo upon landing comprises a pallet, cargo supported on the pallet, a lower cushioning assembly disposed on the pallet and located between the cargo and the pallet, the lower cushioning assembly comprising at least one bladder and at least one compression pad disposed atop the lower cushioning assembly and interposed between the lower cushioning assembly and the cargo. The at least one compression pad comprises a base plate including an upper surface and a lower surface, a support member mounted to the upper surface of the base plate so as to face the cargo, and a thermoplastic layer mounted to the lower surface of the base plate so as to face the cushioning assembly.

According to yet another embodiment of the present disclosure, an impact attenuation system is provided for cushioning air dropped vehicles upon landing. The system comprises a pallet including an upper surface and a lower surface. A vehicle is supported on the upper surface of the pallet, the vehicle comprising an undercarriage. A lower pneumatic cushioning assembly is disposed atop the pallet and beneath the vehicle, the lower cushioning assembly comprising at least one bladder, and at least one compression pad is disposed between an undercarriage of the vehicle and the lower cushioning assembly. The at least one compression pad comprises a base plate including an upper surface and a lower surface, an elongated support member mounted to the upper surface of the base plate so as to face the undercarriage of the vehicle and a thermoplastic layer mounted to the lower surface of the base plate. An upper pneumatic cushioning assembly is located atop the vehicle, the upper cushioning assembly comprising at least one bladder.

BRIEF DESCRIPTION OF THE DRAWINGS

For a more complete understanding of the present disclosure, reference is now made to the following detailed description and the accompanying drawings in which.

DETAILED DESCRIPTION

Figure 1:
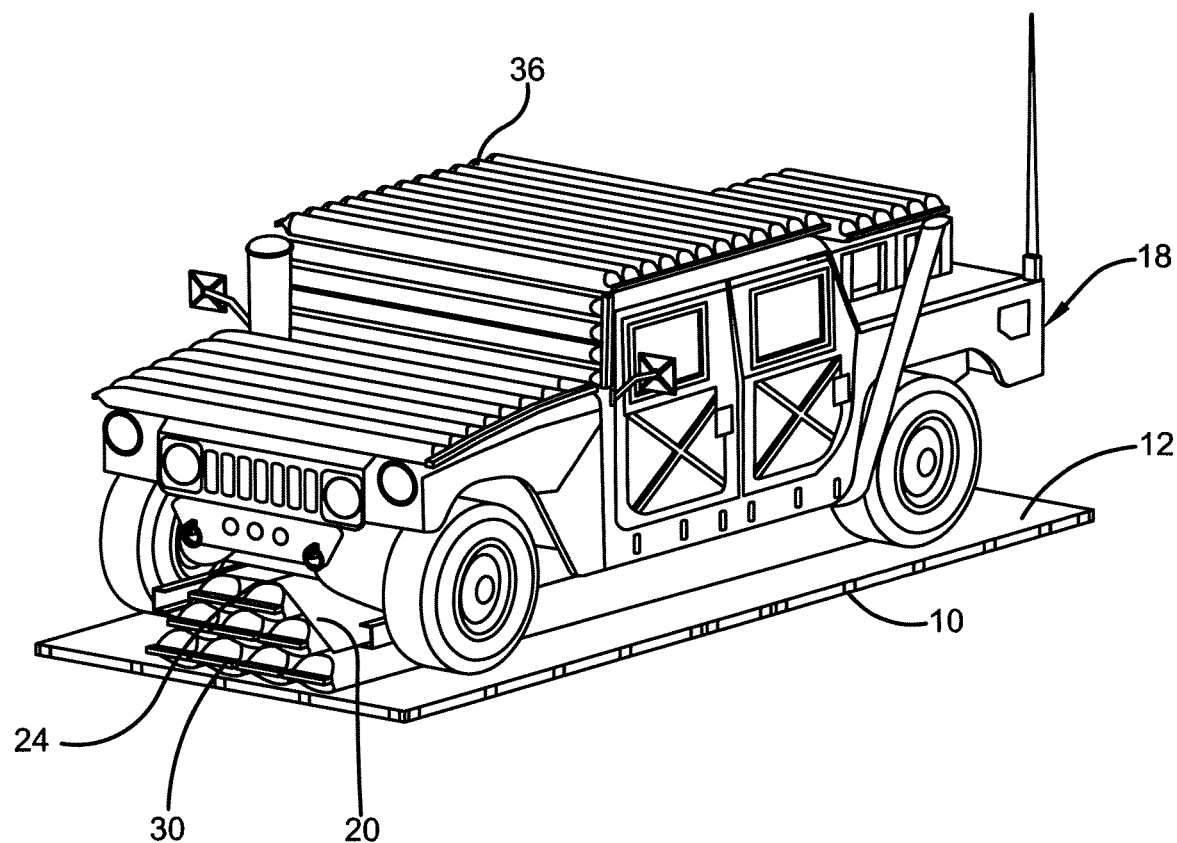
FIG. 1 is a perspective view of palletized cargo, including an impact attenuation system according to one embodiment of the present disclosure.

The present disclosure relates to a system for the airborne deployment of palletized cargo. The system, in one embodiment, includes a pallet 10 having an upper surface 12 and a lower surface. Cargo, such as a vehicle 18, can be supported on the pallet 10. Also provided can be a compression pad 20, that is located between an undercarriage of the vehicle 18 and a pneumatic cushion assembly 30 supported by the pallet.

Figure 2:
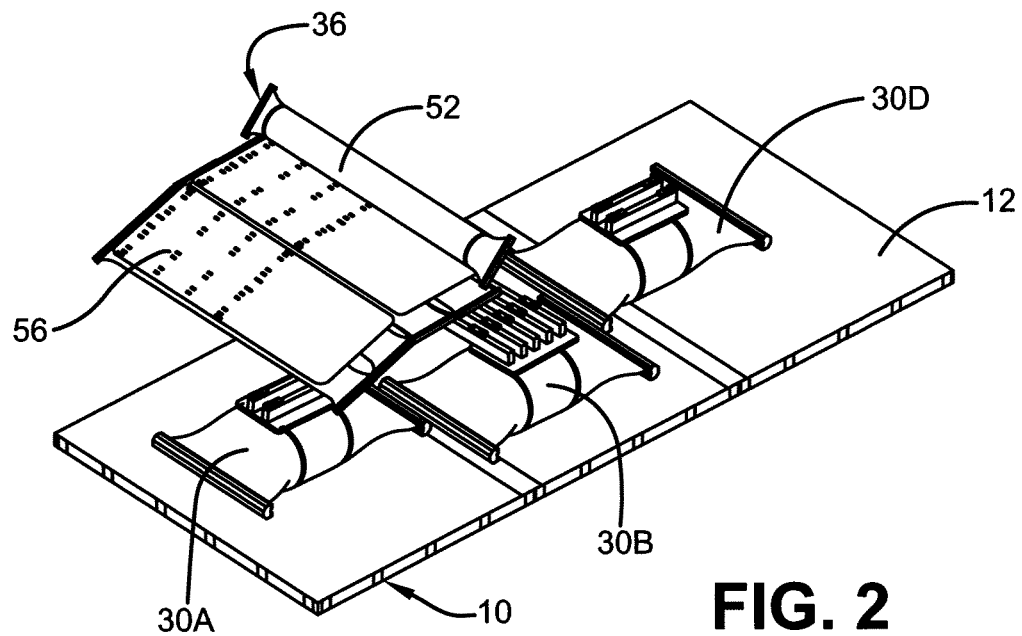
FIG. 2 is a schematic perspective view of a portion of an impact attenuation system according to another embodiment of the present disclosure.
Figure 3:
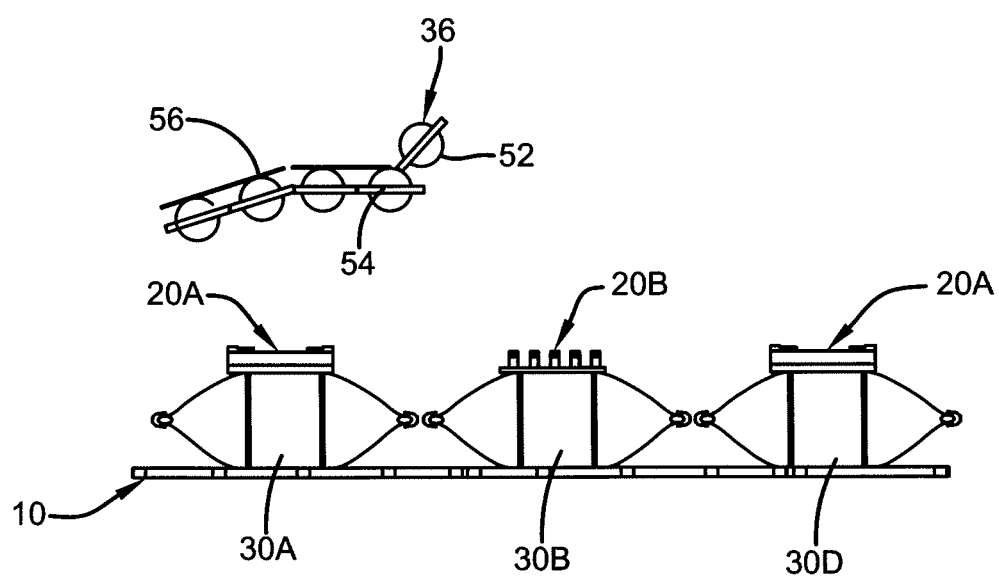
FIG. 3 is a schematic side elevational view of the system of FIG. 2.

In another embodiment, and with reference now to FIGS. 2 and 3, at least one compression pad 20A, 20B is positioned beneath the vehicle 18. In one embodiment, three separate such compression pads can be provided. These are designated by the reference numerals 20A and 20B. If desired, two such compression pads 20A can be provided adjacent the front and rear portions of the vehicle, whereas a central compression pad 20B can be provided amidships of the vehicle. The compression pads 20A and 20B are so termed because their purpose is to distribute the compressive vehicle loads at impact to the underlying bladders, which are inflated at this time.

Figure 4A:
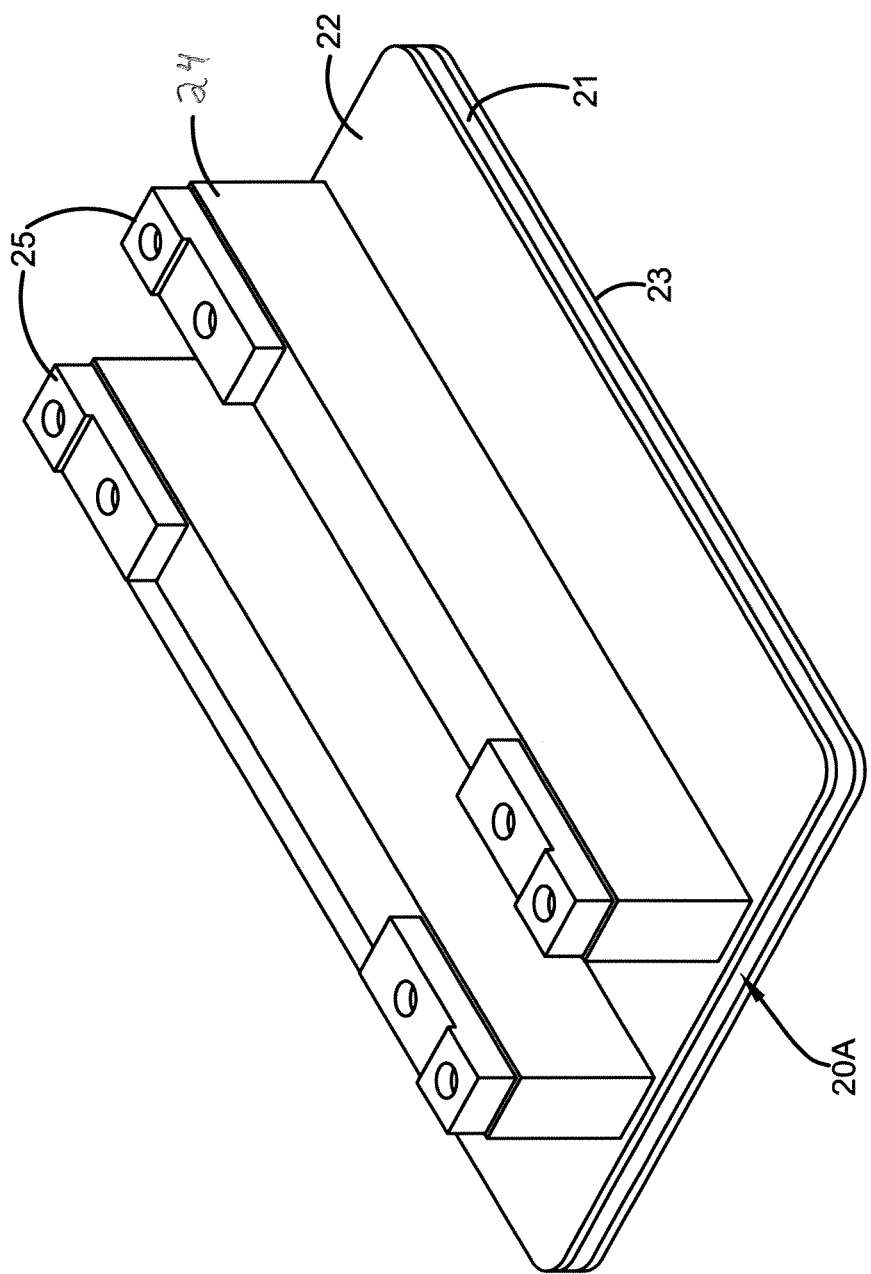
FIG. 4A is an enlarged perspective view of one embodiment of a compression pad of the system of FIG. 2.

With reference now to FIG. 4A, the compression pad 20A may include a base plate 21 having an upper surface 22 and a lower surface 23. In one embodiment, a block of material 24, such as a metal tube, may be secured to the upper surface 22 of the compression pad. Two spaced such metal tubes 24 may be provided as shown. In one embodiment, the tubes can be generally rectangular in cross section and are employed to provide structural rigidity for the anticipated compressive cargo loads at impact with the ground. Although metal tubes have been disclosed, it should be appreciated that the blocks of material 24 could instead be made of an aramid fiber reinforced plastic or a carbon fiber reinforced plastic. In addition, the blocks of material do not need to be rectangular or square in cross section. They could be round, hexagonal or of another cross-sectional shape. In one embodiment, tubes or other hollow structures can be used to reduce the weight of the compression pads and, hence, the weight borne by the pallet. Another alternative would be to employ a hard rubber or similar product for the blocks of material.

In this embodiment, positioned adjacent opposed ends of each respective block 24 can be a support block 25. In one embodiment, the support block 25 can be made of a Delrin® brand acetal homopolymer resin material which is available from DuPont. Of course, other similar types of material can also be employed for the support blocks 25. The support block can have a stepped shape with an enlarged end section as is evident from FIG. 4A. Of course, other shapes are also contemplated. The support block is employed as a vehicle undercarriage cushion material to minimize or eliminate damage to the undercarriage of the vehicle which is held on the pallet when the air dropped pallet lands on the ground. The Delrin® brand material employed for the support block 25 is suitable for this purpose because it is useful for high load mechanical applications because of its significantly high impact resistance, not to mention its tensile strength, stiffness, creep, and fatigue resistance. In one embodiment, the entire combination of the block 24 and the support 25 can be made as a single component which can be attached to the pallet by fasteners (not shown) or the like. In another embodiment, the support block 25 is attached to the block of material 24 by suitable fasteners (not illustrated). Similarly, the block of material 24 is attached to the base plate 21 by suitable fasteners (not illustrated). In this way, replacement of the blocks 24, or only of the support blocks 25 separately can be accomplished if and when that becomes necessary.

If so desired, the lower surface 23 of the compression pad 20A may be covered by a layer of a thermoplastic material which is adhered thereto. In one embodiment, the compression pad 20A can comprise the base plate in the form of a metal sheet to at least the lower face of which is fastened a sheet of an approximately one inch thick ultrahigh molecular weight (UHMW) thermoplastic material. One purpose for the provision of the UHMW material coating the bottom faces 23 of the plates would be to provide a smooth protective surface that will minimize and hopefully eliminate damage, such as puncture or the like, to the bladders on which the compression pads 20A and 20B are supported.

Figure 4B:
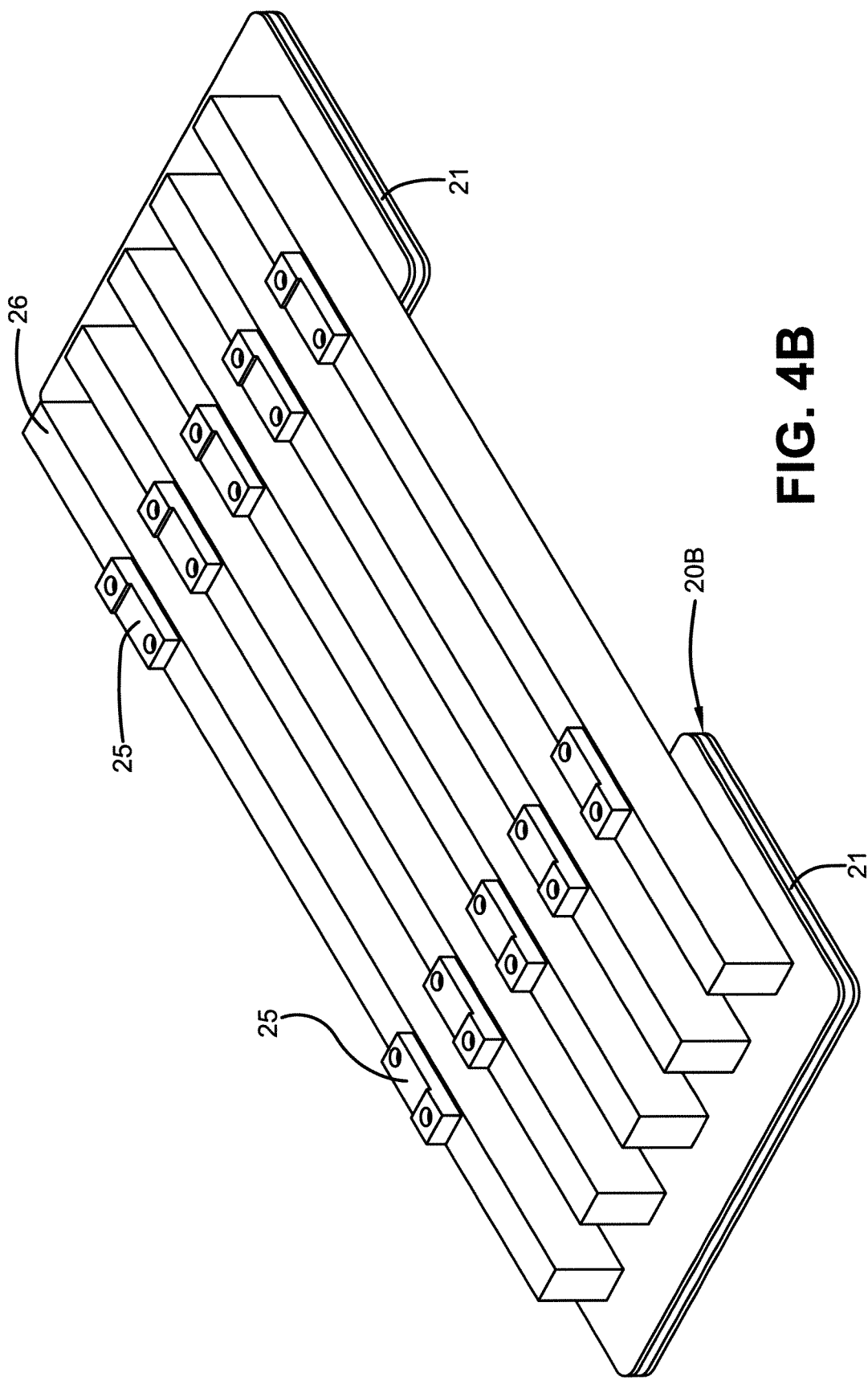
FIG. 4B is an enlarged perspective view of another embodiment of a compression pad of the system of FIG. 2.

With reference now to FIG. 4B, illustrated there is the compression pad 20B which is positioned under a midsection of the vehicle. The compression pad 20B may include two spaced base plates 21. Extending between the base plates 21 and connected thereto can be one or more elongated blocks of material 26, such as metal tubes. It should be apparent that the metal tubes 26 of the compression pad 20B are elongated in relationship to the metal tubes 24 fastened to the compression pads 20A. In this embodiment, the support blocks 25 are spaced from the opposed ends of the elongated blocks 26. This configuration better supports and cushions a central portion of the vehicle 18 shown in FIG. 1.

In the embodiment illustrated in FIG. 4B, five such blocks 26, spaced from each other, connect the two spaced base plates 21 to each other. The compression pads are useful to provide some cushioning and protection for the one or more bladders or lower pneumatic cushions 30 beneath the center section of the vehicle so that undercarriage components of a vehicle do not damage or even puncture such bladders. In addition, the compression pads are meant to protect the vehicle's undercarriage from being damaged by the bladders when they are inflated, as well as dispersing impact loads uniformly upon a landing of the pallet. While the plate 21 is flat and the bladders 30 are rounded, the weight of the vehicle flattens out the bladders to provide a larger contact area between the compression pads and the bladders upon impact with the ground. The compression pads 20A and 20B can be affixed to the undercarriage of the vehicle by way of quick connect/disconnect latches (not illustrated).

Figure 5:
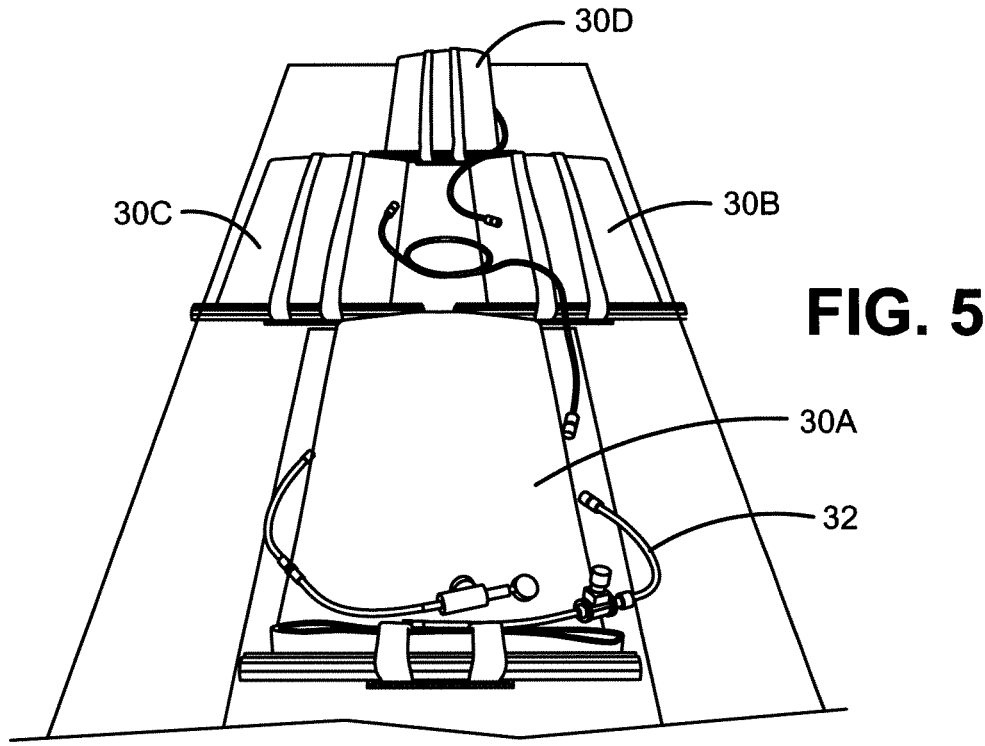
FIG. 5 is a perspective view of a lower pneumatic cushion assembly of the system of FIG. 2.

With reference again to FIG. 1, in one embodiment, one or more lower pneumatic cushions or bladders 30 form a lower cushion assembly which is interposed between the pallet upper surface 12 and the undercarriage of the vehicle 18. With reference now to FIG. 5, in one embodiment, four such pneumatic cushions or airbags 30A, 30B, 30C and 30D can be provided. In this embodiment, a forward cushion 30A can be disposed beneath a front section of the vehicle. A pair of central cushions or airbags 30B and 30C can be located at or near the center of the vehicle. For example, these cushions can be located at or near the center of gravity of the palletized cargo. A rear cushion 30D can be positioned beneath a rear portion of the vehicle. These cushions can be connected to each other and also to a pressurized air source via suitable fluid conduits, as at 32, in order that they can be inflated and deflated as desired.

In one embodiment, the respective bladders 30A-30D are fixed to an inside of a transport bag/template (such as with webbing or the like). Then, when opened, the template can be placed on the pallet and fixed to the pallet, such as with webbing at selected tie down points and the like on the pallet. The bladders would then be properly located for the configuration of the vehicle being transported. It should be appreciated that the bladder configurations may well need to be different for different vehicle types. Similarly, the compression pad configurations will likely be different for different vehicle types.

The forward compression pad 20A can be located such that it is positioned atop the first airbag 30A so that the compression pad is interposed between the first airbag and the undercarriage of the vehicle 18 and the rear compression pad 20A can be provided between the fourth airbag 30D and the vehicle. The center compression pad 20B can be positioned such that it is located atop the two center airbags 30B and 30C. As mentioned, the compression pad 20B can be of a larger and somewhat different configuration than the compression pads 20A in order that it adequately covers each of the two center bladders 30B and 30C as may be evident from FIG. 5. Thus, in this embodiment, there are three compression pads 20A and 20B located atop the four bladders 30A-30D. Of course, other configurations are also contemplated and may depend on the configuration of the vehicle or other cargo supported on the pallet. The several compression pads are disposed between the undercarriage of the vehicle and the lower cushion assembly, which can include a plurality of lower pneumatic cushions or bladders, in order to minimize the possibility of damage occurring to either the undercarriage of the vehicle or to the lower cushion assembly, for example, both upon inflation of the cushion assembly and upon impact of the palletized cargo with the ground.

It is believed that the bladders would be inflated during the descent phase of the palleted cargo, presumably at the command of a conventional microprocessor held onboard the pallet. The microprocessor could initiate inflation of the lower bladder assembly during a descent of the palleted cargo by suitable conventional means.

In one embodiment, the transport bag/template with the bladders and components is laid out on the pallet and subsequently affixed to the pallet. Then, the vehicle is driven onto the pallet while the bladders are deflated. Subsequently, the compression pads are installed under the vehicle with quick connect latching or the like. Then, the vehicle can be tied down with straps, cables, or the like (not shown) and secured to the pallet.

In the embodiment illustrated in FIGS. 2-5, three compression pads can be employed per vehicle at or near the front, center of gravity, and rear of the vehicle. Of course, other designs and numbers of compression pads and lower bladders or cushions can also be employed. Clearly, with other types of vehicles or other types of cargo, a different number and type of compression pads and lower pneumatic cushions may be necessary in order to adequately protect such cargo from damage upon an impact landing.

With reference again to FIG. 1, positioned atop the cargo can be an upper pneumatic cushion assembly 36. With reference now to FIG. 3, and the embodiment illustrated therein, the upper pneumatic cushion assembly or construction can comprise a plurality of aligned individual bladders 52. These several bladders 52 can each extend longitudinally in an orientation which is transverse to a longitudinal axis of the cargo. The bladders can be connected to each other in a side by side orientation via several strips 54 of a connector sheet. In the embodiment illustrated in FIGS. 2 and 3, a single layer of elongated bladders, each of a relatively small diameter (in comparison to the diameter of the lower bladders 30A-30D) can be employed atop the cargo. However, it should be appreciated that other designs of upper cushioning bladders and other configurations of such bladders could be employed, if so desired. In one embodiment, the connector sheets can be made of an ultrahigh molecular weight plastic material. Unlike the lower pneumatic cushion assembly 30A-30D which can be inflated during descent of the palletized cargo, the upper pneumatic cushion assembly can be inflated prior to installation on the palletized cargo.

Further, if desired, a top cover 56 can be disposed atop the several bladders 52, as may be best seen from FIG. 2. The top cover 56 may prove advantageous in that it provides a flat, level surface to support the parachute system which is attached to the pallet.

It should be appreciated that both the upper and lower pneumatic cushion constructions or assemblies can be reusable. This is advantageous in contrast with single use dunnage that is often employed for airdropped cargo. The reusable nature of the upper pneumatic cushion construction is advantageous in relation to the present day use of cardboard honeycomb dunnage which needs to be disposed of after each air drop or use. It should be noted that the several bladders of the upper pneumatic cushion construction can remain interconnected and can be organized when deflated and packed so as to enable such reuse.

Figure 6:
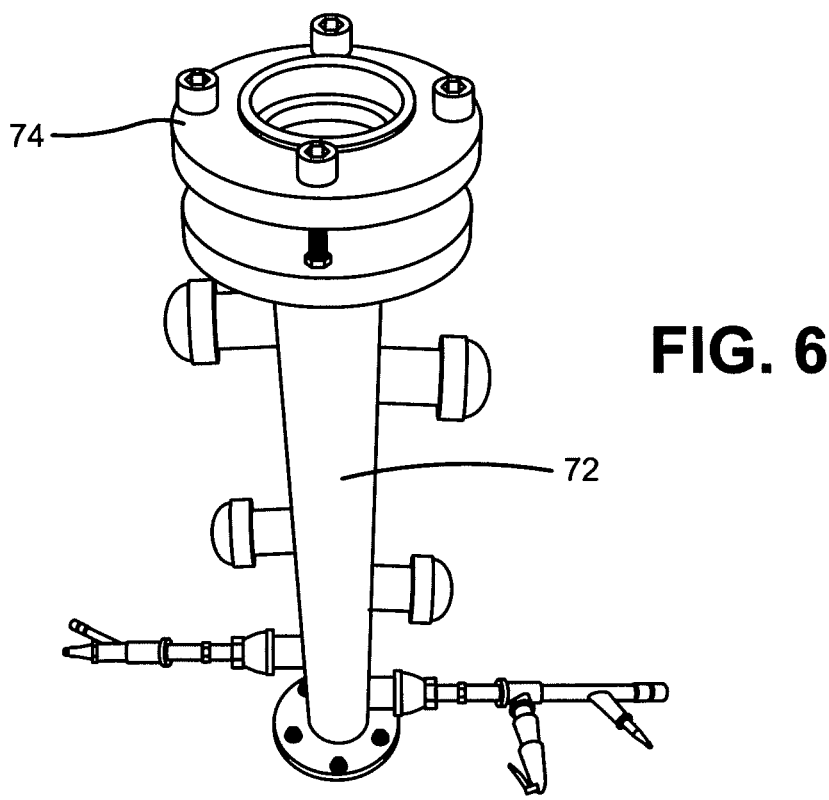
FIG. 6 is a perspective view of a plenum which can be employed with the pneumatic cushion assembly of FIG. 5.
Figure 7:
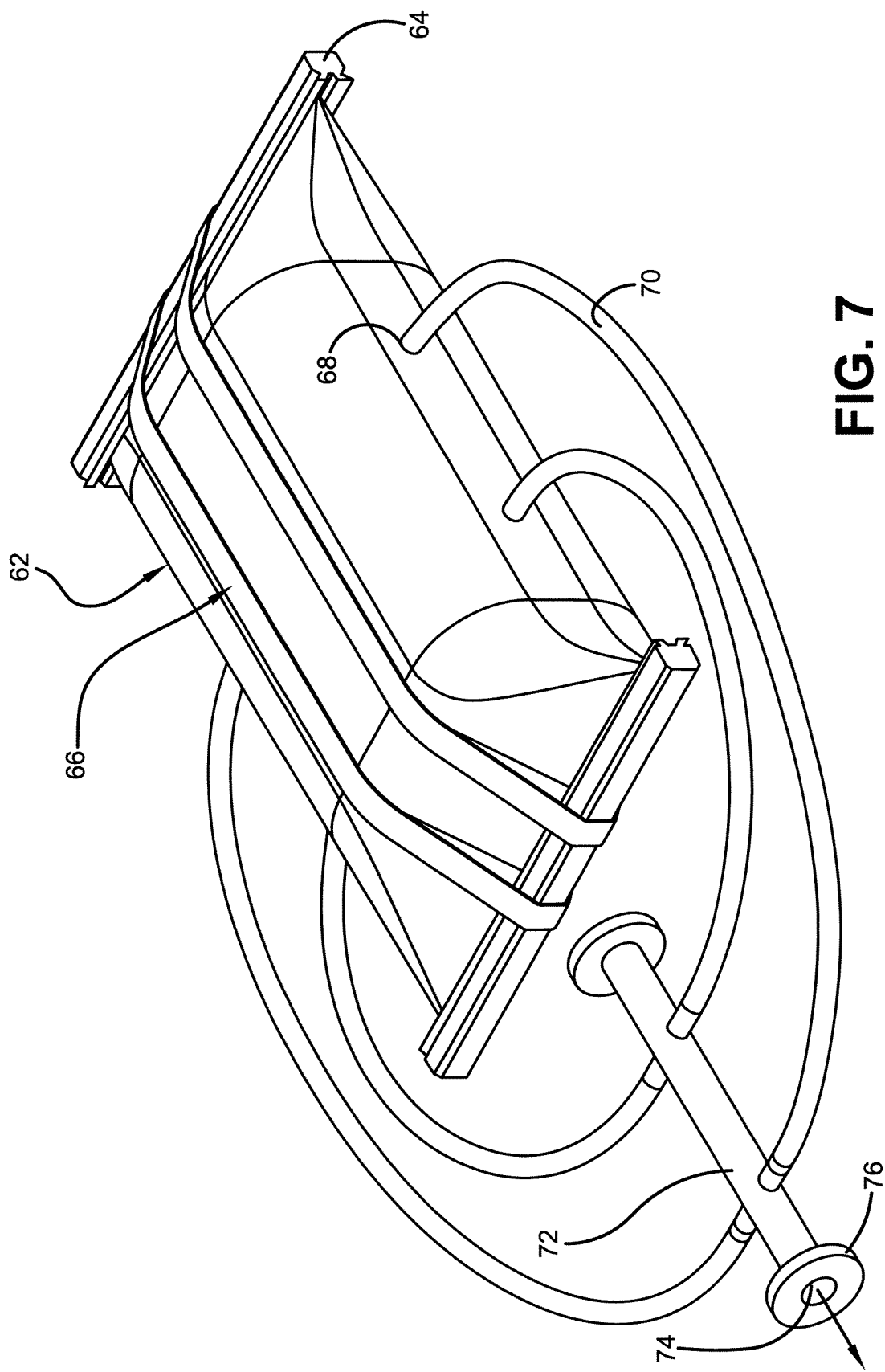
FIG. 7 is a perspective view of a lower pneumatic cushion and associated conduits according to one embodiment of the present disclosure.

With reference now to FIG. 7, in one embodiment, the plurality of lower pneumatic cushions may each include a bladder, such as at 62 which has its opposed ends closed by end clamps 64 and may include axially extending reinforcing straps 66. In addition, the bladder may be reinforced with a bias braid which may extend at an angle of 75°. In one embodiment, one or more ports 68 can be located on the bladder may be connected via suitable conduits 70. The conduits 70 can terminate at their other end so that they connect to a plenum 72. The plenum 72 may be provided with a vent 74 in which is positioned a known burst disc 76. With reference now also to FIG. 6, one embodiment of such plenum 72 can be provided with a vent 74 in which a suitable known burst disc 76 is accommodated. Thus, in this embodiment, a single burst disc 76 can be employed in connection with a plurality of such bladders 62 which can comprise the lower pneumatic cushion assembly.

As is known in the art, a burst disc or rupture disc or pressure safety disc is a non-reclosing pressure release safety device that protects a pressure vessel, in this case the bladder, from overpressurization and a possible rupture of the bladder itself. In essence, a burst disc is a type of sacrificial part because it has a one-time use membrane which fails at a predetermined differential pressure and before a high enough pressurization is experienced in the bladder that the bladder would itself rupture. Burst discs provide an instant response which may be within milliseconds upon impact of the air dropped cargo with the ground. Burst discs themselves are well-known in the art and, therefore, it is believed that no further discussion of same is merited. In this way, shock to the cargo via the bladders can be retarded, since the lower pneumatic cushion assembly is deflated very quickly, so as to minimize any effect on the cargo. It is currently contemplated that the upper pneumatic cushion bladders 52 do not need to employ burst discs or the like structures.

Figure 8:
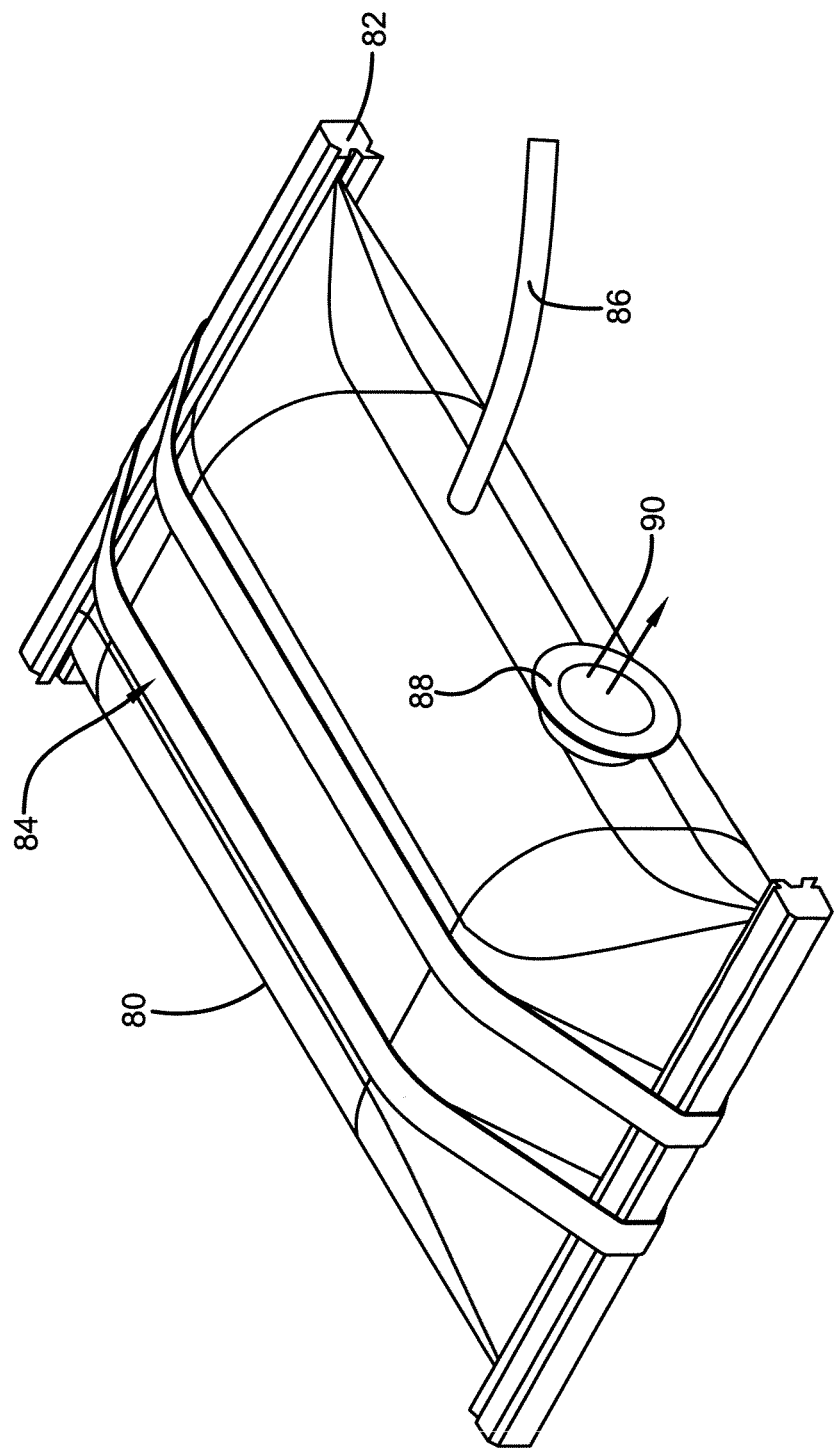
FIG. 8 is a perspective view of a lower pneumatic cushion according to another embodiment of the present disclosure.

With reference now to FIG. 8, in another embodiment, the lower pneumatic cushion may include a bladder 80 which has its opposed ends sealed via end clamps 82 and which may be reinforced with axially extending straps 84. Mounted to the bladder 80 can be a fill or vent hose 86 and, spaced therefrom, can be a housing 88 over a port in the bladder for accommodating a burst disc 90. It should be appreciated that in this embodiment, each of the several bladders 80 which can comprise the at least one lower pneumatic cushion would be provided with its own separate burst disc 90.

Figure 9:
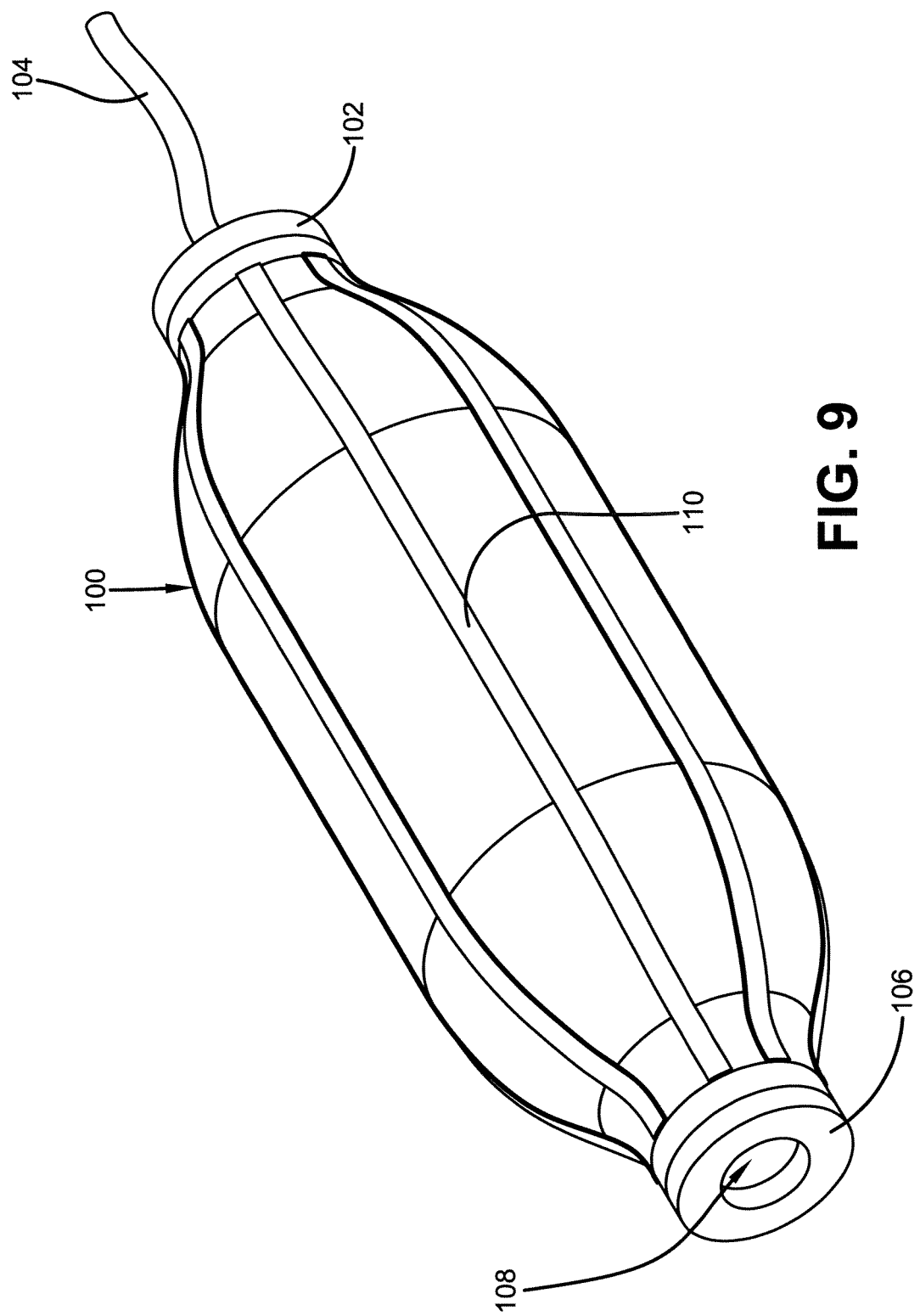
FIG. 9 is a perspective view of a lower pneumatic cushion according to still another embodiment of the present disclosure.

According to still another embodiment as illustrated in FIG. 9, the plurality of pneumatic cushions can each include a bladder 100 that is provided with a first end housing 102 to which is connected a fill/vent hose 104. Disposed on an opposed end thereof can be a second end housing including an end plate 106 which accommodates a burst disc 108. In this embodiment, axial reinforcing straps 110 can extend longitudinally from the first end housing 102 to the second end housing 106 in order to reinforce the bladder 100.

Figure 10:
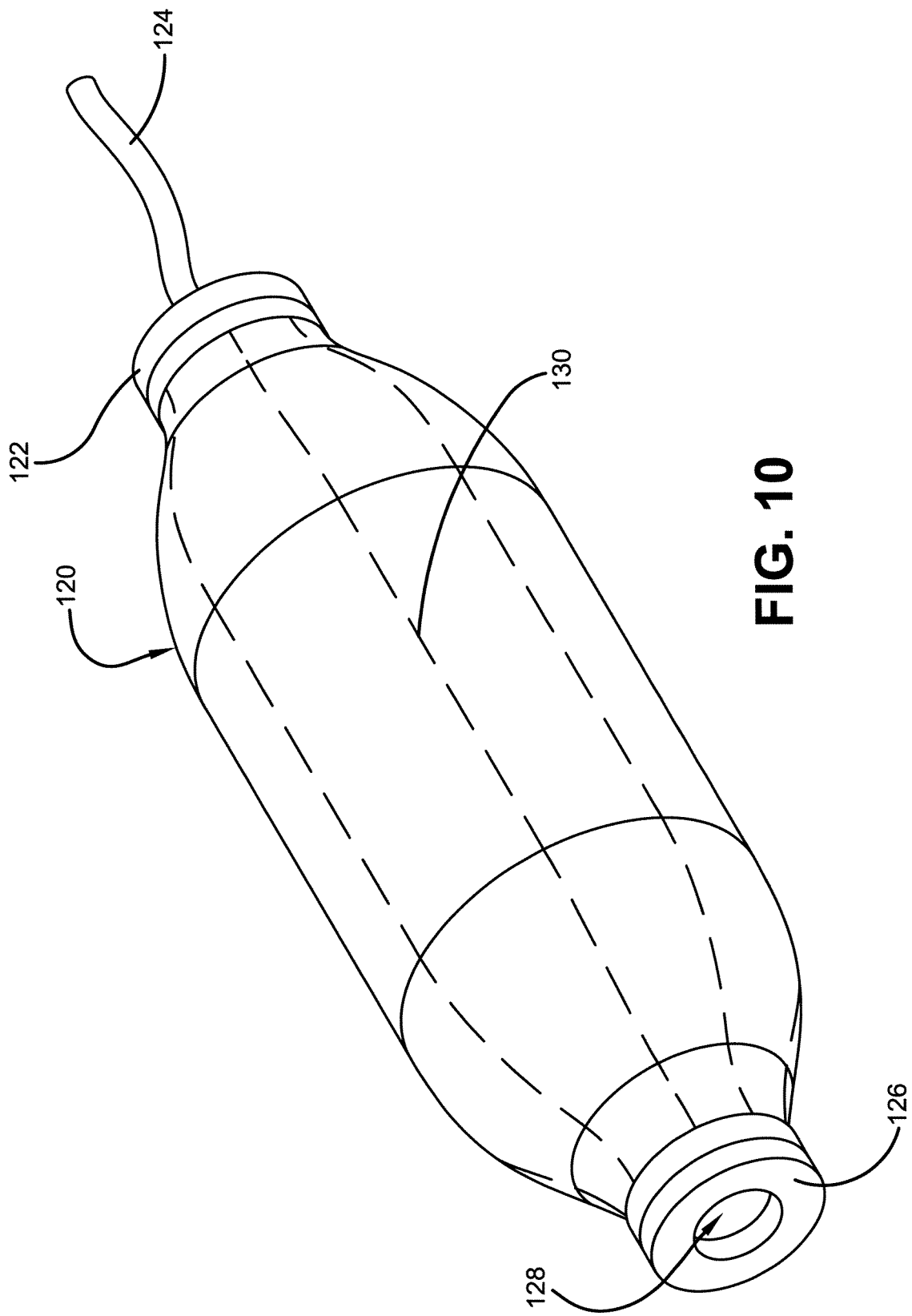
FIG. 10 is a perspective view of yet another embodiment of a lower pneumatic cushion according to the present disclosure.

As illustrated in FIG. 10, according to a further embodiment of the present disclosure, each respective lower pneumatic cushion may comprise a bladder 120 which is provided on its first end with a first end housing 122 to which is connected a fill/vent hose 124. A second end housing of the bladder 120 can include an end plate 126 which can accommodate a burst disc 128. In this embodiment, however, the bladder 120 is provided with braided-in axially extending reinforcing members in the form of cords 130, as shown. It should be appreciated that the braided in axially extending cords can replace the bonded on axial straps which are illustrated in the embodiments of FIGS. 7-9.

Figure 11:
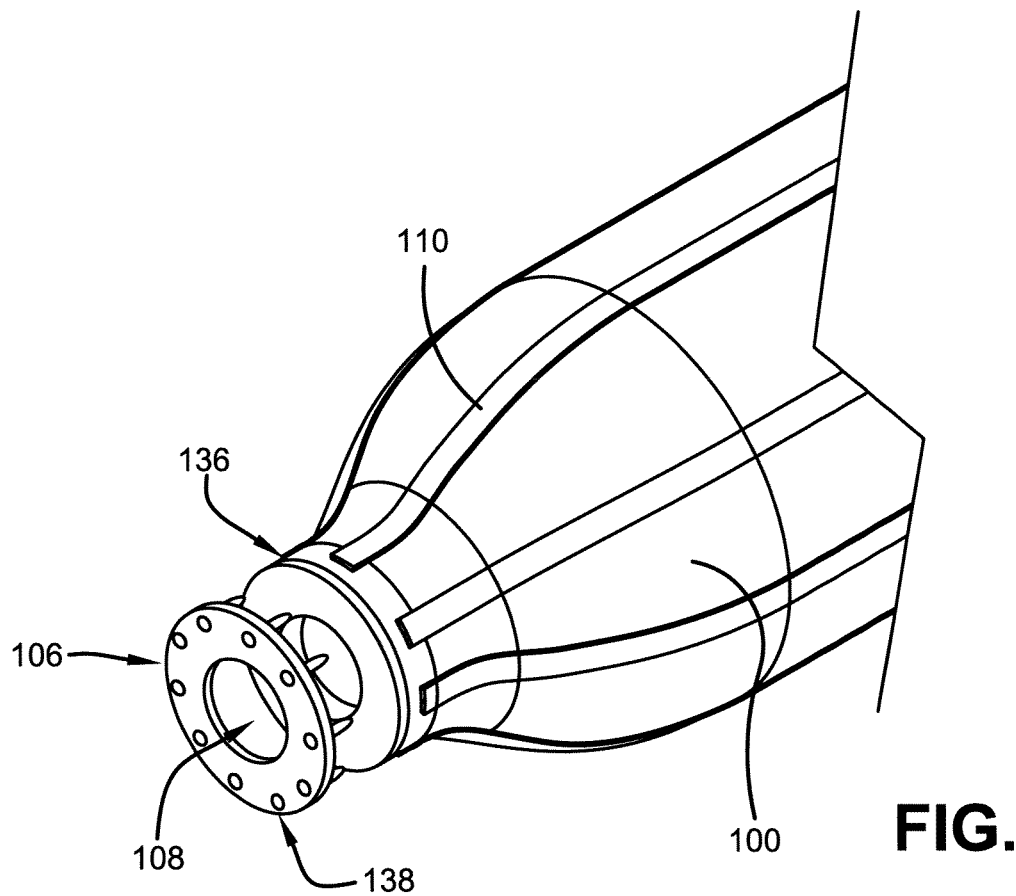
FIG. 11 is an enlarged perspective view of a further embodiment of a lower pneumatic cushion according to the present disclosure.

With reference now to FIG. 11, there is shown an enlarged view of a portion of the bladder 100 illustrated in FIG. 9. It can be seen from this embodiment that the second end housing 106 can include a braid clamp 136 to which the respective ends of the several straps 110 are secured. Similarly, with respect to the braided in axial straps 130 illustrated in FIG. 10, these too could be mounted to such a braid clamp 136. Connected to the braid clamp 136 is a clamp ring 138. Accommodated between the braid clamp 136 and the clamp ring 138 can be the burst disc 108.

Figure 12:
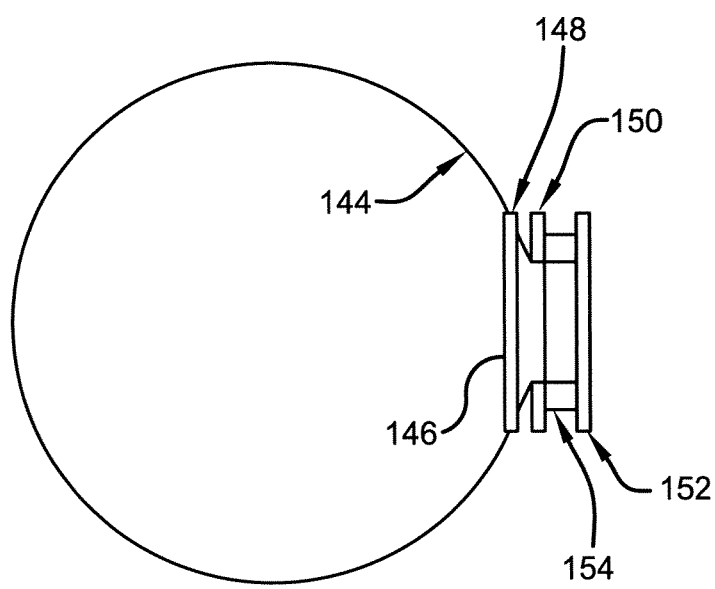
FIG. 12 is an end elevational view in cross section of a further embodiment of a lower pneumatic cushion according to the present disclosure.

With reference now to FIG. 12, in one embodiment, a bladder 144 can have a side opening or port 146. Mounted to the bladder 144 over the side opening 146 can be an internal clamp ring 148 so as to define a pass through 150. Mounted to the internal clamp ring 148 can be an external clamp ring 152. Held between the internal clamp ring 148 and the external clamp ring 152 can be a burst disc 154. In one embodiment, a six inch diameter port can accommodate a six inch diameter burst disc.

Figure 13:
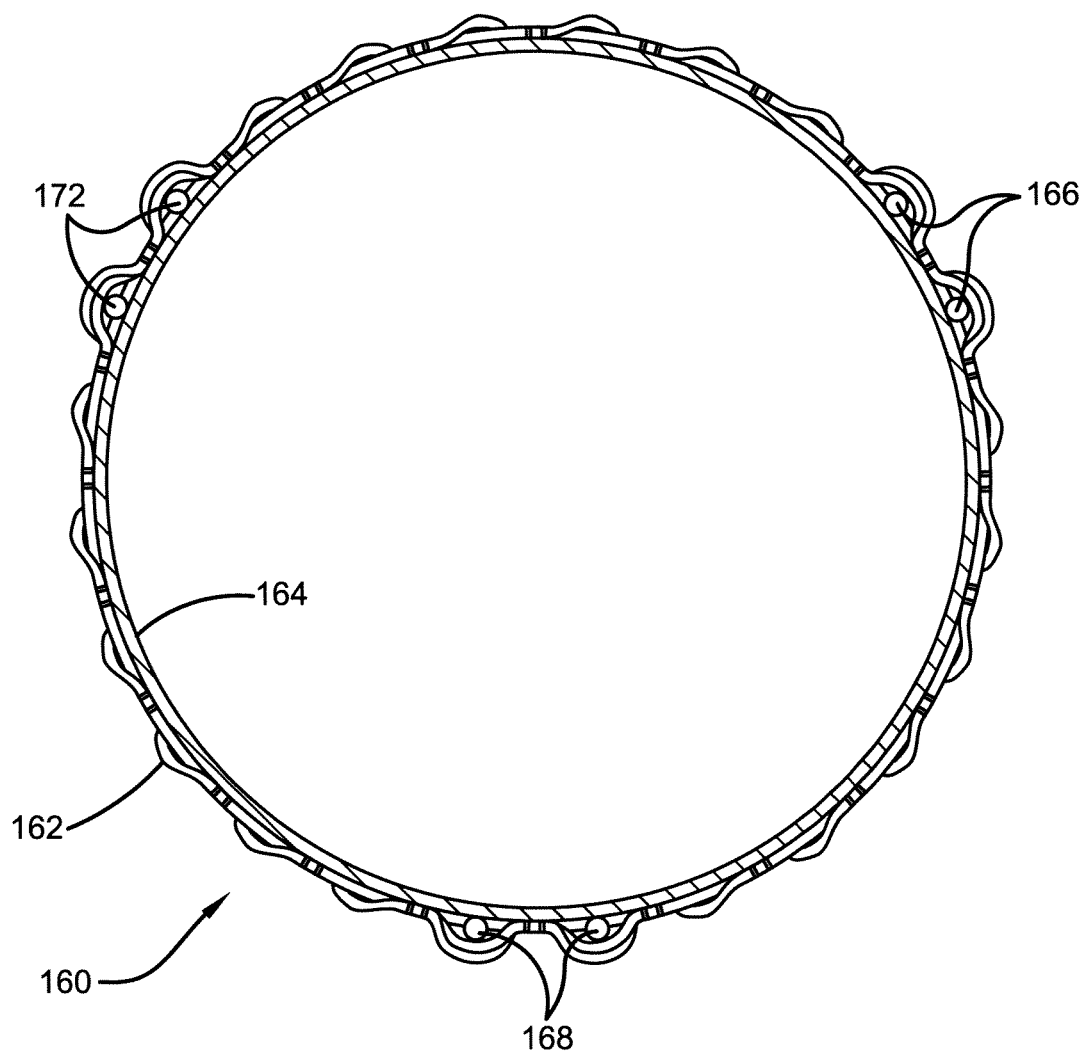
FIG. 13 is an end elevational view in cross section of one embodiment of a lower or upper pneumatic cushion according to the present disclosure.

With reference now to FIG. 13, in one embodiment, at least some of the lower and upper pneumatic cushions can each comprise a bladder 160 which is provided with a cylindrical braid 162 that is lined on its inner surface by an elastomeric bladder material 164 to seal in air. This construction creates the stiffness for the bladder. In one embodiment, three reinforcing fiber bundles can extend axially along the bladder, such as at 166, 168 and 172. These can be spaced at 120° apart around the circumference of the cylindrical braid. The axial fibers can be surrounded by and held in place by the fibers of the braid 162. The braided construction of the pressurized bladder or tube gives it structural characteristics affording the bladders stiffness against bending in the plane of the reinforcing axial fibers. The fibers also assist the bladder in that they will resist buckling.

Figure 14:
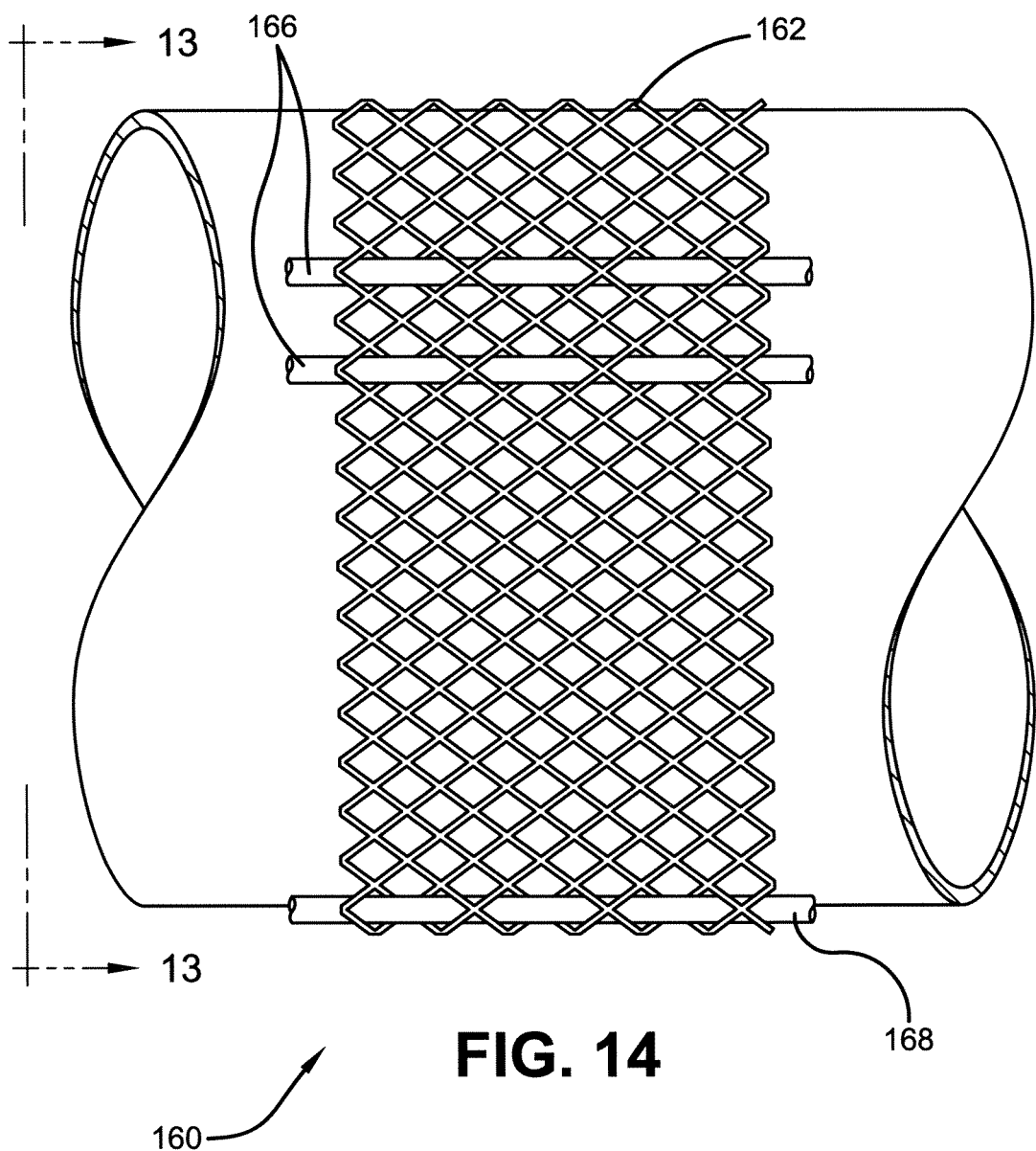
FIG. 14 is a side elevational view of a portion of the pneumatic cushion of FIG. 11.

With reference now to FIG. 14, the bladder 160 is illustrated in side view. It can be seen that the first axial fiber bundle 166 is held in place by the cylindrical braid 162. The braided fibers illustrated in FIG. 14 can follow a continuous left to right spiral path over the length of the bladder wall. In the meantime, the axial fiber bundles 166, 168 and 172 follow paths which are parallel to the axis of the bladder. The axial fibers can be distributed at intervals around the circumference of the tube wall. In the embodiment illustrated, the axial fibers are contained within spaces formed between the braided fibers. In one embodiment, the axial fibers can be made from a woven webbing. It should be appreciated that in one embodiment, the bladder can be defined by elastomeric material which is coated or applied to the interior surface of the braided fibers. In this way, a cylinder or liner of an elastomeric film, together with the braided fibers, can define a gas retention means or bladder.

Figure 15:
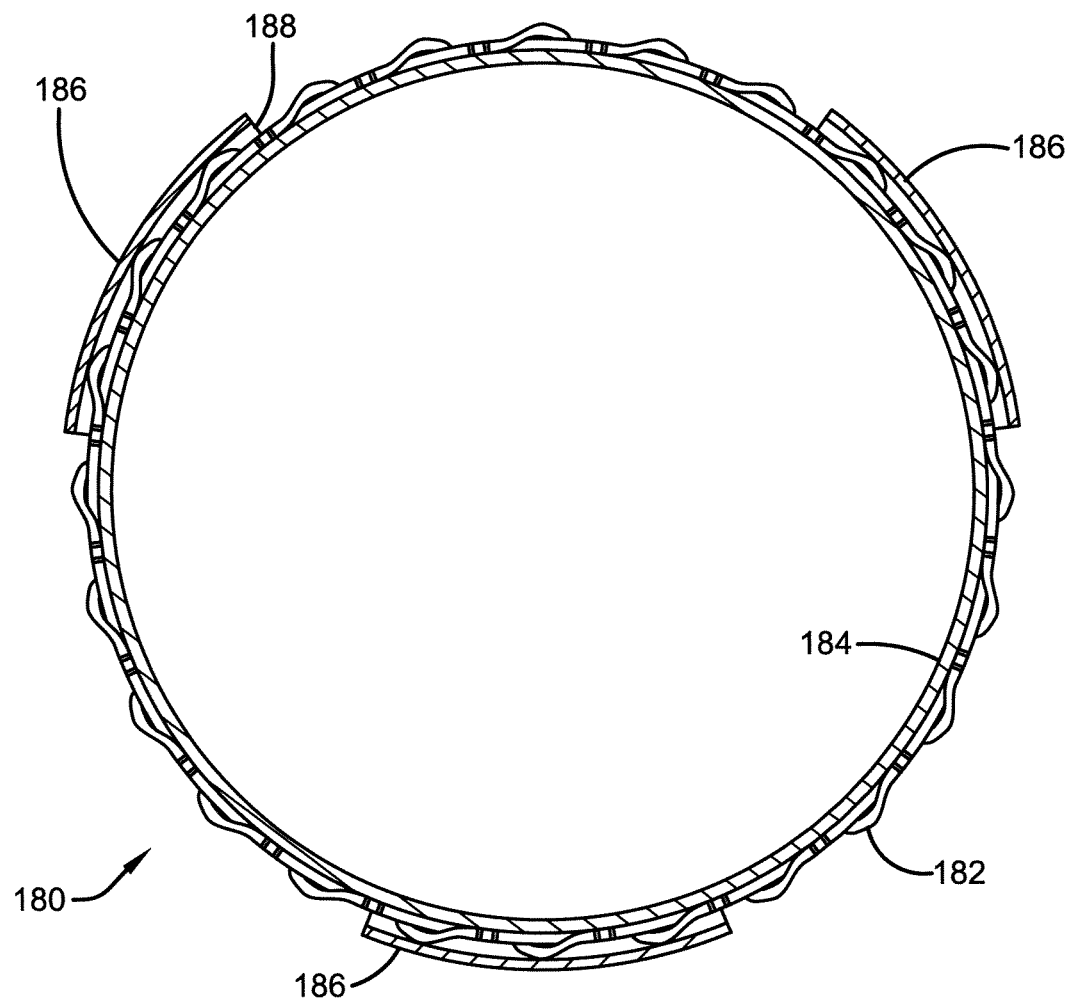
FIG. 15 is a cross sectional view of another embodiment of a lower or upper pneumatic cushion according to the present disclosure.

With reference now to FIG. 15, there is shown an embodiment of a cushion in which a bladder 180 comprises an axial braid 182 surrounding an elastomeric tube 184. In this embodiment, webbing 186 is mounted via an adhesive 188 to the braid. The webbing 186 can be disposed axially on the surface of the braid. Reference is also made to Brown et al., U.S. Pat. No. 5,735,083, the subject matter of which is incorporated hereinto by reference in its entirety.

The disclosed system for cushioning air dropped cargo may include a compressed gas source which selectively feeds air or another gas to at least the lower bladder assembly which is fluidly coupled to the compressed gas source. If desired, a command processor can be configured to generate an inflation initiation command signal in response to an initiation signal, such as during a descent of the palletized cargo. The command processor can also generate an inflation ending command signal in response to a sensor which indicates that the desired pressure has been reached in the one or more bladders comprising the lower bladder assembly. As noted previously, venting of the lower bladder assembly may be done via one or more burst discs.

If desired, the upper bladder assembly disposed atop the cargo need not be inflated just before landing of the cargo, but can be pre-inflated and, thus, can be mounted atop the cargo in its inflated form.

The manifold 72 can be fluidly coupled to the one or more bladders of the lower bladder assembly. If desired, suitable pressure sensors can be fluidly coupled to the one or more airbags of the lower bladder assembly. The pressure sensor or sensors can also communicate with a known command processor which will initiate pressurization of the respective bladders upon command. Also, the pressure sensors can be configured to measure the fill pressure of the one or more bladders so that they are not overfilled. The pressurization of at least the bladders of the lower bladder assembly can take place immediately before impact of the air dropped cargo. To this end, such pressure sensors could be configured to measure the fill pressure of the airbags and provide a signal to the command processor when the fill pressure is adequate. At that point, the command processor can generate a signal to stop further pressurization of the bladders.

In one embodiment, the working pressure for the lower pneumatic cushion bladders may be on the order of 50 PSI with a disc burst pressure being 70 PSI. However, the working pressure for the bladders of the upper pneumatic cushion may be significantly lower than the working pressure for the lower pneumatic cushions. In one embodiment, the available height between the pallet and the compression pads may be about 10 inches.

Figure 16:
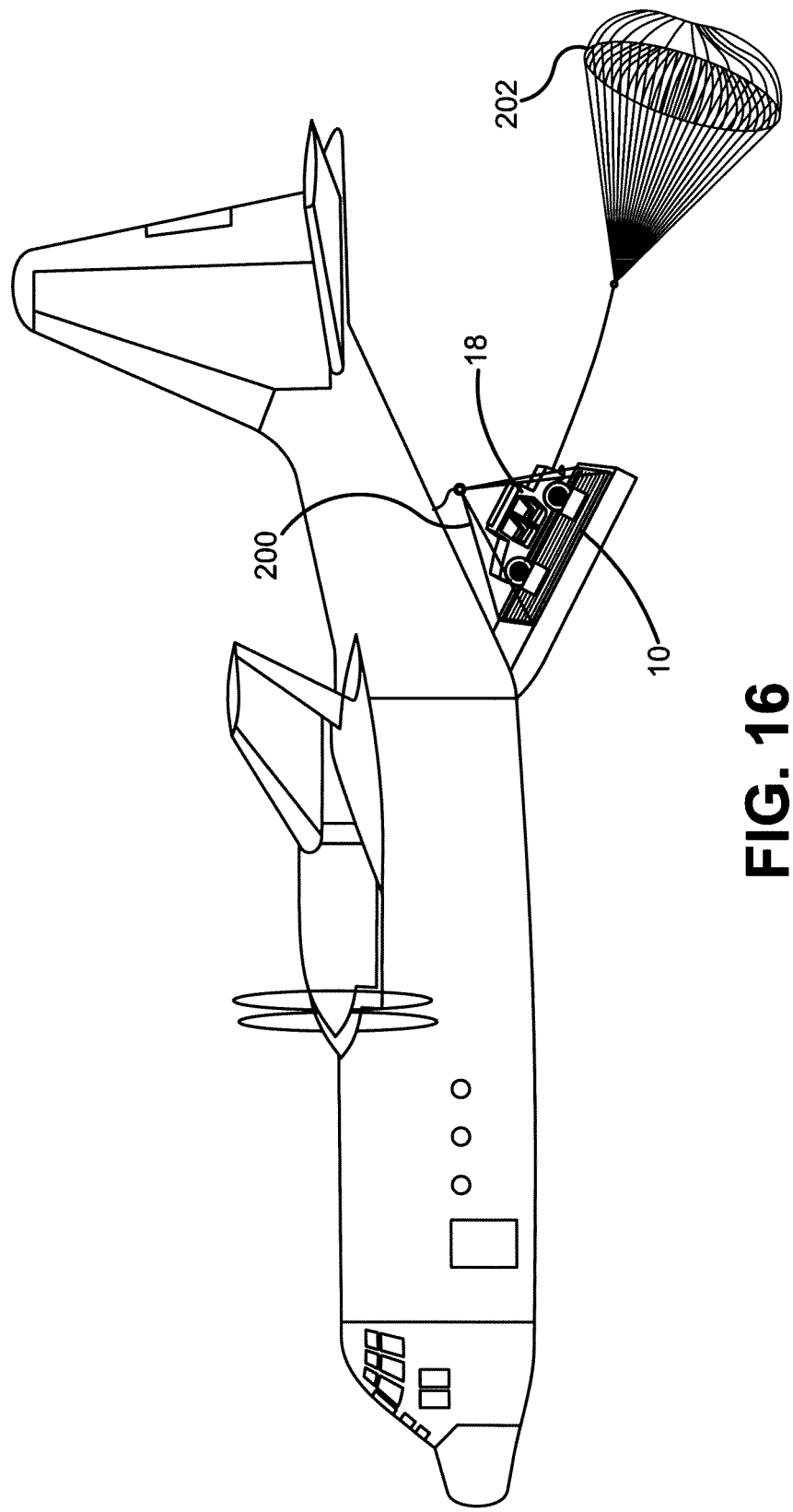
FIG. 16 is a perspective view of palletized cargo which is in the process of being air dropped.

With reference now to FIG. 16, the system for cushioning air cargo can also include parachute rigging 200 which is secured to the pallet 10 and to which is mounted one or more parachutes including an extraction parachute 202 and one or more main parachutes.

As is known in the art, the palletized cargo is often connected to the extraction parachute 202, such that the extraction parachute pulls the palletized cargo from the back of an aircraft. In this way, the palletized cargo can be transported and subsequently air dropped from the back of an aircraft, such as a C-17 Globemaster or a C-130 Hercules airplane. In the illustration of FIG. 16, the main parachute is not shown since it has yet to be inflated as the cargo is still in the process of being released from the aircraft. In one embodiment, the cargo can be a vehicle 18, such as a high mobility multi-purpose wheeled vehicle (HMMWV).

In order to drive the vehicle 18 away from the pallet, the various bladders 30A-30D of the lower cushion assembly are deflated and the several compression pads 20A-20B are unlatched from the vehicle undercarriage by the quick connect latches. Once the compression pads are detached from the vehicle's undercarriage and the upper cushion assembly is removed, the vehicle can be driven off the pallet after landing.

The instant disclosure has been described with reference to a number of embodiments. Obviously, modifications and alterations will occur to others upon reading and understanding the preceding detailed description. It is intended that the several embodiments be construed as including all such modifications and alterations insofar as they come within the scope of the appended claims or the equivalents thereof.

The invention claimed is:

1. A system for cushioning air dropped cargo upon landing, the system comprising:
   a pallet;
   cargo supported on the pallet;
   a lower cushioning assembly interposed between the pallet and the cargo, the lower cushioning assembly comprising an inflatable bladder which is inflated upon descent of the pallet;
   an upper cushioning assembly located atop the cargo, the upper cushioning assembly comprising a pre-inflated bladder.

2. The system of claim 1 further comprising parachute rigging mounted to the pallet.

3. The system of claim 1 further comprising a pneumatic circuit connected to the lower cushioning assembly for selectively inflating the inflatable bladder.

4. The system of claim 1 wherein the lower cushioning assembly comprises a plurality of spaced inflatable bladders.

5. The system of claim 1 wherein the upper cushioning assembly comprises a plurality of connected pre-inflated bladders.

6. The system of claim 1 further comprising a cover located atop the upper cushioning assembly.

7. A system for cushioning air dropped cargo upon landing, the system comprising:
   a pallet;
   cargo supported on the pallet;
   a lower cushioning assembly disposed on the pallet and located between the cargo and the pallet, the lower cushioning assembly comprising at least one bladder;
   at least one compression pad disposed atop the lower cushioning assembly and interposed between the lower cushioning assembly and the cargo, the at least one compression pad comprising:
      a base plate including an upper surface and a lower surface,
      a support member mounted to the upper surface of the base plate so as to face the cargo,
      a cushion block mounted to the support member, wherein the cushion block faces the cargo,
      a thermoplastic layer mounted to the lower surface of the base plate so as to face the lower cushioning assembly.

8. The system of claim 7 further comprising a pneumatic circuit connected to the lower cushioning assembly for selectively inflating the at least one bladder.

9. The system of claim 7 wherein the lower cushioning assembly comprises a plurality of spaced bladders.

10. The system of claim 7 further comprising an upper cushioning assembly comprises a plurality of connected bladders located atop the cargo.

11. An impact attenuation system for cushioning air dropped vehicles upon landing, the system comprising:

a pallet including an upper surface and a lower surface;

a vehicle supported on the upper surface of the pallet, the vehicle including an undercarriage;

a lower pneumatic cushioning assembly disposed atop the pallet and beneath the vehicle, the lower cushioning assembly comprising at least one bladder;

at least one compression pad disposed between an undercarriage of the vehicle and the lower cushioning assembly, the at least one compression pad comprising:
- a base plate including an upper surface and a lower surface,
- an elongated support member mounted to the upper surface of the base plate so as to face the undercarriage of the vehicle,
- a thermoplastic layer mounted to the lower surface of the base plate; and an upper pneumatic cushioning assembly located atop the vehicle, the upper cushioning assembly comprising at least one bladder.

12. The system of claim 11 further comprising parachute rigging releasably coupled to the pallet.

13. The system of claim 11 further comprising a pneumatic circuit connected to the lower cushioning assembly for selectively inflating the at least one bladder.

14. The system of claim 13 wherein the lower cushioning assembly comprises a plurality of spaced bladders connected by the pneumatic circuit.

15. The system of claim 11 wherein the upper cushioning assembly comprises a plurality of connected bladders.

16. The system of claim 15 wherein the plurality of bladders of the upper cushioning assembly are aligned and are connected in a side-by-side arrangement.

17. The system of claim 11 wherein the at least one compression pad further comprises a cushion block mounted to the support member, wherein the cushion block faces the undercarriage of the vehicle.

18. The system of claim 17 wherein the at least one compression pad protrudes away from the support member.

19. The system of claim 18 wherein two spaced compression pads protrude away from the support member.

\* \* \* \* \*